(12) United States Patent
Im (10) Patent No.: US 10,171,951 B2
(45) Date of Patent: Jan. 1, 2019

(54) SYSTEM AND METHOD FOR POSITIONING MOBILE DEVICE BY USING BLUETOOTH SIGNAL

(71) Applicant: NEMUSTECH CO., LTD., Seoul (KR)

(72) Inventor: Hyung Jae Im, Seoul (KR)

(73) Assignee: NEMUSTECH CO., LTD., Seoul (KR)

( * ) Notice: Subject to any disclaimer, the term of this patent is extended or adjusted under 35 U.S.C. 154(b) by 0 days.

(21) Appl. No.: 15/686,174

(22) Filed: Aug. 25, 2017

(65) Prior Publication Data

US 2018/0041872 A1   Feb. 8, 2018

Related U.S. Application Data

(63) Continuation of application No. PCT/KR2016/000855, filed on Jan. 27, 2016.

(30) Foreign Application Priority Data

Feb. 25, 2015   (KR) .................... 10-2015-0026705

(51) Int. Cl.
*H04W 64/00* (2009.01)
*H04W 84/18* (2009.01)
*H04W 4/00* (2018.01)
*H04W 4/04* (2009.01)
*G01S 5/00* (2006.01)

(52) U.S. Cl.
CPC .................. *H04W 4/04* (2013.01); *G01S 5/00* (2013.01); *H04W 64/00* (2013.01); *H04W 84/18* (2013.01)

(58) Field of Classification Search
CPC ... H04W 64/006; H04W 24/08; H04W 84/12; H04W 4/04; H04W 4/02; H04W 4/025; H04W 84/18; G01S 5/0252; G01S 5/04; G06Q 30/0261
See application file for complete search history.

(56) References Cited

U.S. PATENT DOCUMENTS

| | | | | |
|---|---|---|---|---|
| 9,204,251 | B1* | 12/2015 | Mendelson | G08G 1/14 |
| 2010/0121567 | A1* | 5/2010 | Mendelson | G01C 21/206 |
| | | | | 701/467 |
| 2013/0304301 | A1* | 11/2013 | Rakshit | G05D 1/0276 |
| | | | | 701/25 |
| 2013/0311087 | A1* | 11/2013 | Yeh | G01C 21/00 |
| | | | | 701/461 |
| 2015/0139007 | A1* | 5/2015 | Liu | H04W 24/08 |
| | | | | 370/252 |

* cited by examiner

*Primary Examiner* — Nizar N Sivji
(74) *Attorney, Agent, or Firm* — JCIPRNET (57) ABSTRACT

Provided are a system and method for positioning a mobile device by using a Bluetooth signal, and more particularly, to a system and method for positioning a mobile device by using a Bluetooth signal, in which a location of a user carrying a mobile device is effectively determined by using the mobile device receiving a Bluetooth signal, and a method of positioning the mobile device.

Provided are a system and method for positioning a mobile device by using a Bluetooth signal, in which a location of the mobile device may be more accurately determined by considering a Bluetooth signal receiving environment of the mobile device when providing a service and method of determining a location of the mobile device by using a Bluetooth signal.

17 Claims, 5 Drawing Sheets

SYSTEM AND METHOD FOR POSITIONING MOBILE DEVICE BY USING BLUETOOTH SIGNAL

CROSS-REFERENCE TO RELATED APPLICATION

This application is a Continuation of PCT International Application No. PCT/KR2016/000855, filed on Jan. 27, 2016, which claims priority under 35 U.S.C § 119(a) to Patent Application No. 10-2015-0026705, filed in Korea on Feb. 25, 2015, all of that are hereby expressly incorporated by reference into the present application.

BACKGROUND

1. Technical Field

The present disclosure relates to a system and method for positioning a mobile device by using a Bluetooth signal, and more particularly, to a system and method for positioning a mobile device by using a Bluetooth signal, in which a location of a user carrying a mobile device is effectively determined by using the mobile device receiving a Bluetooth signal, and a method of positioning the mobile device.

2. Background Art

With the recent increase in the supply of Bluetooth devices, various services for determining a user location based on a Bluetooth signal have been developed. In particular, positioning methods performed using a Bluetooth signal have been developed to determine a position of a user indoors which is beyond the reach of a geographical positioning system (GPS) signal or to more accurately locate a user position than when using a GPS signal.

In a method of determining a user location by using a Bluetooth signal, a beacon that periodically transmits a Bluetooth signal is used. A range of a Bluetooth signal transmitted by a beacon is set as approximately 10 meters, and a distance between the beacon and a mobile device is calculated based on an intensity of a Bluetooth signal received by the mobile device receiving the Bluetooth signal. That is, the higher the intensity of a Bluetooth signal received by the mobile device, the mobile device is determined to be more proximate to the beacon.

The method according to the related art as described above is not suitable to be used as a service for determining a user position in practice. Users often cover mobile devices such as a smartphone with a phone case or sometimes carry the mobile devices deep inside a bag. In particular, if a smartphone is encased with a metal-containing case, then Bluetooth signal reception sensitivity of the smartphone may be sharply lowered. In addition, if an obstacle is placed between a user and a beacon, transmission of a Bluetooth signal may not be easy, and thus, the mobile device may receive a weak Bluetooth signal. Depending on types of mobile devices, manufacturers set a low reception sensitivity of a Bluetooth receiving module when they release products. As such, there are various reasons that prevent mobile devices from smoothly receiving Bluetooth signals. A system for determining a location by using a Bluetooth signal, which is installed in the form of an application on a mobile device, is typically incapable of distinguishing between a weak Bluetooth signal weakened due to an obstacle and a weak Bluetooth signal intensity resulting from a distance from a beacon by using the method according to the related art. Accordingly, an error to incorrectly determine a mobile device to be far from a beacon even when the mobile device is very close to the beacon may be easily made. Due to this problem, an error of 10 meters or more occurs easily when determining a user location.

When providing advertisement or doing business by determining a user location or providing a service of providing various location-related information, if the user location is incorrectly determined with an error of 10 meters or more, it is almost impossible to offer a normal service. When a service based on the method of the related art is provided, user satisfaction regarding the service is also significantly lowered.

DISCLOSURE

Technical Problem

Provided are a system and method for positioning a mobile device by using a Bluetooth signal, in which a location of the mobile device may be more accurately determined by considering a Bluetooth signal receiving environment of the mobile device when providing a service and method of determining a location of the mobile device by using a Bluetooth signal.

Technical Solution

According to an aspect of an embodiment, a system for positioning a mobile device by using a Bluetooth signal is provided, in which the mobile device receives a Bluetooth signal, which is periodically transmitted by a beacon, to determine the location of the mobile device, wherein the system includes: a strong signal beacon configured to periodically transmit a Bluetooth signal having an identification number of the strong signal beacon, with a relatively strong intensity; a plurality of weak signal beacons arranged within a Bluetooth signal range of the strong signal beacon and configured to transmit Bluetooth signals having an identification number of the plurality of weak signal beacons, with a relatively weak intensity compared to the intensity of the Bluetooth signal of the strong signal beacon; and a mobile device configured to store signal properties of the beacons (the strong signal beacon and the plurality of weak signal beacons) corresponding to the identification numbers of the beacons and determine whether Bluetooth signal reception sensitivity of the mobile device is normal based on the identification numbers of the beacons included in a Bluetooth signal received by the mobile device and signal properties corresponding to the identification numbers of the beacons and determine a location of the mobile device relative to the beacons based on a result of the determining whether Bluetooth signal reception sensitivity of the mobile device is normal.

According to an aspect of another embodiment, a method of positioning a mobile device by using a Bluetooth signal is provided, in which the mobile device receives a Bluetooth signal, which is periodically transmitted by a beacon, to determine a location of the mobile device, wherein the method includes: (a) storing an identification number of a strong signal beacon that periodically transmits a Bluetooth signal including the identification number of the strong signal beacon with a relatively strong intensity and identification numbers of a plurality of weak signal beacons that are arranged within a Bluetooth signal range of the strong signal beacon and configured to transmit Bluetooth signals having identification numbers of the plurality of weak signal beacons with a relatively weak intensity compared to the intensity of the Bluetooth signal of the strong signal beacon, and signal properties of the beacons (the strong signal beacon and the plurality of weak signal beacons) corresponding to the identification numbers of the beacons in the mobile device; (b) receiving Bluetooth signals transmitted by the beacons, determining the identification numbers of the beacons included in the Bluetooth signals, and determining the signal properties of the beacons that transmitted the Bluetooth signals, wherein the receiving is performed by the mobile device; (c) determining whether a Bluetooth signal reception sensitivity of the mobile device is normal based on the identification numbers and the signal properties of the beacons included in the received Bluetooth signals, wherein the determining is performed by the mobile device; and (d) determining a location of the mobile device relative to the beacons based on a result of (c).

Advantageous Effects

According to the system and method for positioning a mobile device by using a Bluetooth signal of the present disclosure, a location of the mobile device may be accurately determined even when Bluetooth reception sensitivity of the mobile device is poor due to the surroundings of the mobile device or other obstacles.

BEST MODE

A system and method for positioning a mobile device by using a Bluetooth signal according to the present disclosure will now be described more fully with reference to the accompanying drawings.

Figure 1:
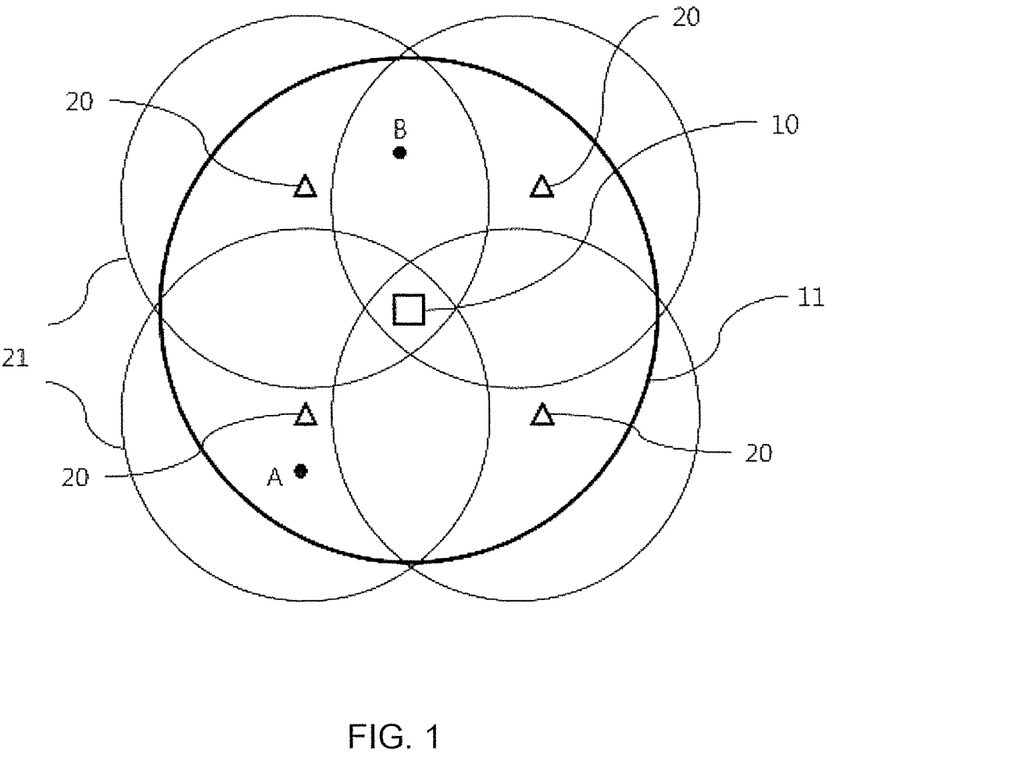
FIGS. 1 and 2 are schematic views for describing a structure of a system for positioning a mobile device by using a Bluetooth signal, according to an embodiment of the present disclosure.
Figure 2:
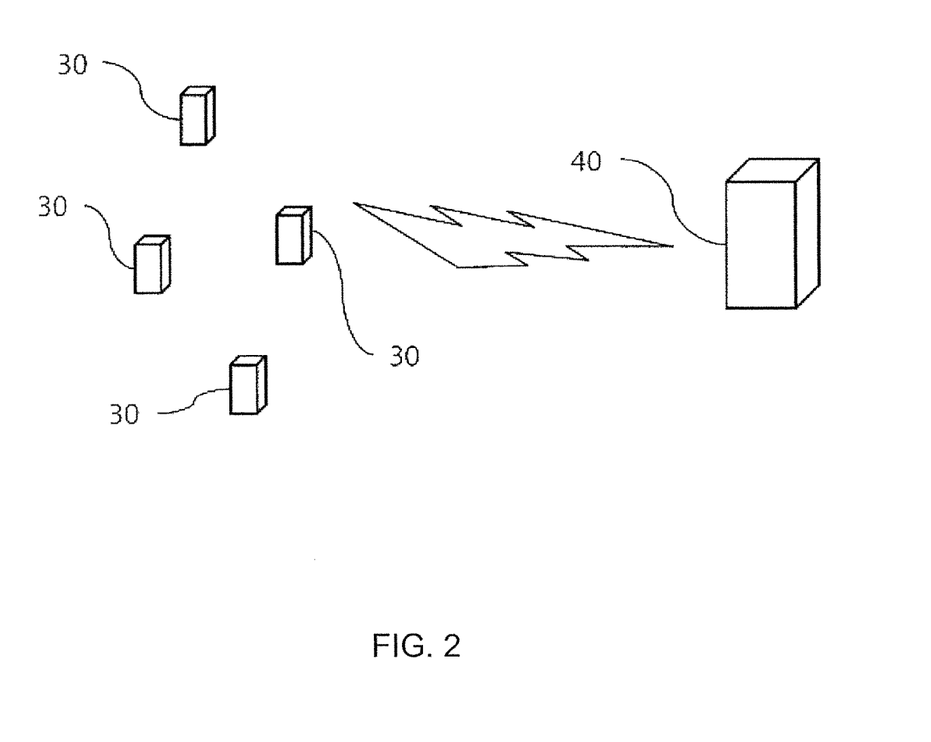

FIGS. 1 and 2 are schematic views for describing a structure of a system for positioning a mobile device by using a Bluetooth signal, according to an embodiment of the present disclosure.

The system for positioning a mobile device by using a Bluetooth signal according to the present embodiment includes a strong signal beacon 10, a plurality of weak signal beacons 20, and a mobile device 30.

The strong signal beacon 10 and the plurality of weak signal beacons 20 both periodically transmit a Bluetooth signal. A Bluetooth signal transmitted by the strong signal beacon 10 and the plurality of weak signal beacons 20 may include various types of information according to selection of an operator, and essentially include an identification number of each of the beacons (the strong signal beacon 10 and the plurality of weak signal beacons 20). A MAC address of each beacon may be an identification number of each beacon, or another number set by an operator may be an identification number of each beacon.

While intensities of Bluetooth signals transmitted by typical beacons according to the related art are generally uniform, in the system for positioning a mobile device by using a Bluetooth signal according to the present disclosure, both the strong signal beacon 10 and the weak signal beacons 20 that transmit Bluetooth signals having intentionally differently set intensities are used.

The strong signal beacon 10 transmits a relatively strong Bluetooth signal compared to that of the weak signal beacons 20, and the weak signal beacons 20 transmit a relatively weak Bluetooth signal compared to that of the strong signal beacon 10. Accordingly, a Bluetooth signal of the strong signal beacon 10 is transmitted to a broader range than a Bluetooth signal of the weak signal beacons 20. A ratio of an intensity of the Bluetooth signal of the weak signal beacons 20 to that of a Bluetooth signal of the strong signal beacon 10 may be set variously according to selection of an operator, the operator may set an intensity of a Bluetooth signal of the weak signal beacons 20 to about 30% to about 80% of that of a Bluetooth signal of the strong signal beacon 10.

A plurality of weak signal beacons 20 are matched with one strong signal beacon 10. The weak signal beacons 20 are arranged within a Bluetooth signal range 11 of the strong signal beacon 10 to which they are matched. Locations of and intervals between the weak signal beacons 20 arranged within the Bluetooth signal range 11 of the strong signal beacon 10 may be set in various manners. In the present embodiment, an example in which one strong signal beacon 10 and four weak signal beacons 20 are arranged as illustrated in FIG. 1 will be described. The Bluetooth signal range 11 of the strong signal beacon 10 and Bluetooth signal ranges 21 of the weak signal beacons 20 are denoted by a solid circular line around the strong signal beacon 10 and the weak signal beacons 20. As illustrated in FIG. 1, in the present embodiment, a case where the Bluetooth signal range 11 of the strong signal beacon 10 is included in the sum of the Bluetooth signal ranges 21 of the weak signal beacons 20 corresponding to the strong signal beacon 10 will be described. That is, an embodiment in which Bluetooth signals of all of the weak signal beacons 20 are set to reach the Bluetooth signal range 11 of the strong signal beacon 10 will be described.

The mobile device 30 that a user carries has a function of receiving a Bluetooth signal. A smartphone or a tablet having a Bluetooth function may be used as the mobile device 30. The mobile device 30 stores identification numbers of the strong signal beacon 10 and the weak signal beacons 20 and information regarding whether each beacon is the strong signal beacon 10 or the weak signal beacons 20 (hereinafter, the information is referred to as 'signal properties'). Identification numbers and signal properties of beacons may be stored when an application for implementing the method of positioning a mobile device by using a Bluetooth signal according to the present embodiment is installed on the mobile device 30 or may be stored as the mobile device 30 accesses a server 40 in real time via a network to receive signal properties corresponding to identification numbers of beacons.

In regard to the present embodiment, description will focus on a case where the mobile device 30 receives signal properties of the strong signal beacon 10 and the weak signal beacons 20 previously stored on the server 40, through a network to store the signal properties.

The server 40 stores the identification numbers of the strong signal beacon 10 and the weak signal beacons 20 and the signal properties thereof. In addition, a ratio of a Bluetooth signal intensity of the weak signal beacons 20 with respect to a Bluetooth signal intensity of the strong signal beacon 10 may also be stored on the server 40. In addition, the server 40 may also store a distance between the strong signal beacon 10 and the weak signal beacons 20 or position coordinates of the strong signal beacon 10 and the weak signal beacons 20.

The mobile device 30 effectively determines its location based on whether a Bluetooth signal of the strong signal beacon 10 or the weak signal beacons 20 respectively having differently set Bluetooth signal intensities and the intensity of Bluetooth signals received as described above.

If no Bluetooth signal of either the strong signal beacon 10 or the weak signal beacons 20 is received, the mobile device 30 may determine its location to be far from the strong signal beacon 10 and the weak signal beacons 20.

If a Bluetooth signal of the strong signal beacon 10 is received by the mobile device 30, but no Bluetooth signal of the weak signal beacons 20 is received, the mobile device 30 determines its Bluetooth signal reception sensitivity as abnormal. In the present embodiment, the strong signal beacon 10 and the weak signal beacons 20 are arranged such that Bluetooth signals of the weak signal beacons 20 all reach the Bluetooth signal range 11 of the strong signal beacon 10 as illustrated in FIG. 1. If a Bluetooth signal of the strong signal beacon 10 is received by the mobile device 30, but no Bluetooth signal of the weak signal beacons 20 is received, this indicates that a Bluetooth signal reception sensitivity of the mobile device 30 is abnormal. If the mobile device 30 is encased in a phone case which hinders reception of a Bluetooth signal or a user carries the mobile device 30 inside a bag where it is difficult to receive a Bluetooth signal, only a Bluetooth signal of the strong signal beacon 10 but no Bluetooth signal of the weak signal beacons 20 may be received as described above. In addition, a low Bluetooth signal reception sensitivity may be set depending on a type of the mobile device 30.

When a Bluetooth signal reception sensitivity of the mobile device 30 is abnormal as described above, a location of the mobile device 30 is determined only based on a Bluetooth signal of the strong signal beacon 10. When a Bluetooth signal of the strong signal beacon 10 is continuously received by the mobile device 30 for a predetermined period of time or longer, the mobile device 30 may be determined to be in proximity to the strong signal beacon 10 corresponding to an identification number of the strong signal beacon 10 that transmitted the received Bluetooth signal. Alternatively, by taking the poor Bluetooth signal reception sensitivity of the mobile device 30 into consideration, a distance between the mobile device 30 and the strong signal beacon 10 that is proportional to an intensity of a Bluetooth signal of the strong signal beacon 10 may be approximately estimated to determine a location of the mobile device 30.

According to the related art, when a weak Bluetooth signal is received, it was not possible to distinguish whether the weak Bluetooth signal is received due to a distance between a mobile device and a beacon or due to the surroundings around the mobile device. Thus, according to the related art, when a distance of a mobile device with respect to a beacon is determined based on an intensity of a Bluetooth signal, a great error may be caused frequently. Therefore, it was often difficult to provide positioning services.

However, according to the present disclosure, by determining a Bluetooth signal reception sensitivity of the mobile device 30 based on whether a Bluetooth signal of the strong signal beacon 10 or the weak signal beacons 20 is received, a location of the mobile device 30 may be determined highly accurately.

When Bluetooth signals of both the strong signal beacon 10 and the weak signal beacons 20 are received by the mobile device 30, a Bluetooth signal reception sensitivity of the mobile device 30 is determined as normal. Here, a location of the mobile device 30 is determined to be proximate to a location of the weak signal beacons 20 based on an identification number of the weak signal beacons 20 that transmitted the received Bluetooth signal. A location of the mobile device 30 may be more accurately determined to be at a particular point between the strong signal beacon 10 and the weak signal beacons 20 by calculating the location of the mobile device 30 based on a ratio between intensities of Bluetooth signals of the strong signal beacon 10 and the weak signal beacons 20 received by the mobile device 30 and intensities of Bluetooth signals respectively transmitted by the strong signal beacon 10 and the weak signal beacons 20.

When Bluetooth signals of two or more weak signal beacons 20 are received with a Bluetooth signal of the strong signal beacon 10 at a location marked as point B in FIG. 1, the mobile device 30 determines its location to be in an area where the Bluetooth signals of the weak signal beacons 20 corresponding to an identification number of the received Bluetooth signals overlap each other. As described above, a location of the mobile device 30 may be more accurately calculated by comparing relative intensities of Bluetooth signals of each beacon received by the mobile device 30 and relative locations between the strong signal beacon 10 and the weak signal beacons 20 (or position coordinates of each beacon received by the server 40).

Hereinafter, a process of performing the method of positioning a mobile device by using a Bluetooth signal to determine a location of the mobile device 30 by using the system for positioning a mobile device by using a Bluetooth signal according to the present embodiment configured as described above will be described.

First, the strong signal beacon 10 and the weak signal beacons 20 are arranged as illustrated in FIG. 1. As described above, Bluetooth signals of the weak signal beacons 20 are all set to reach the Bluetooth signal range 11 of the strong signal beacon 10. The method of positioning a mobile device by using a Bluetooth signal according to the present embodiment is performed via an application installed on the mobile device 30. As illustrated in FIG. 2, locations of the mobile device 30 are determined as a user moves while carrying the mobile devices 30 on which an application for performing the method of positioning a mobile device by using a Bluetooth signal according to the present embodiment is installed. The mobile devices 30 are connected to the server 40 via a wireless network.

Figure 3:
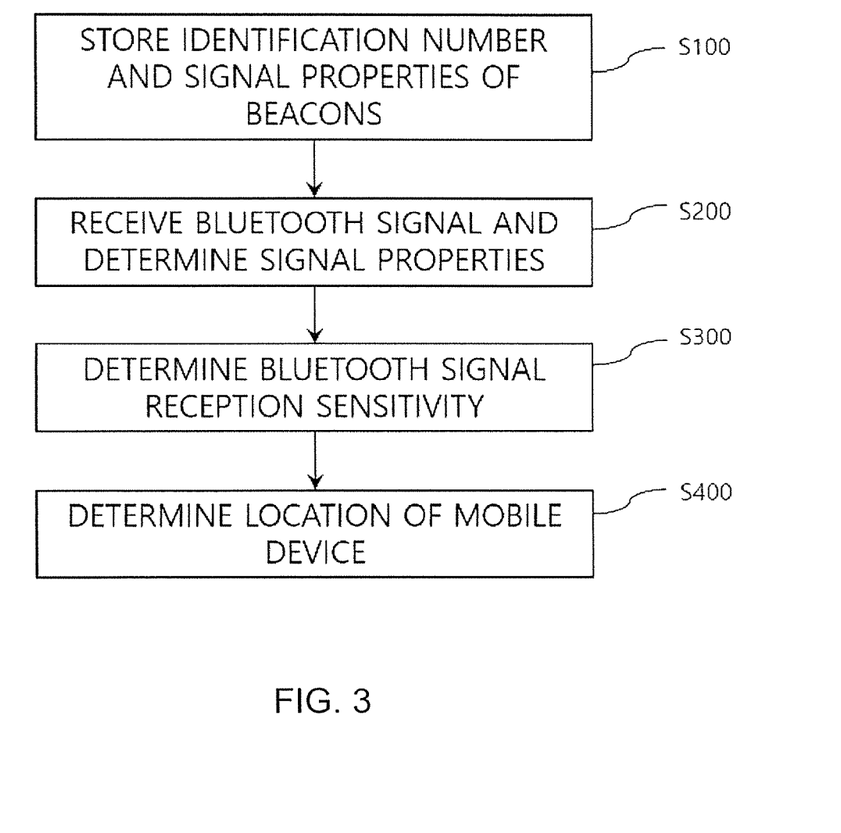
FIG. 3 is a flowchart of a method of positioning a mobile device by using a Bluetooth signal according to the present disclosure, by using the system illustrated in FIGS. 1 and 2 for positioning a mobile device by using a Bluetooth signal.

In this state, the mobile device 30 stores identification numbers and signal properties of beacons (step (a); S100). The identification numbers of the beacons and signal properties corresponding thereto may be stored when an application for performing the method of positioning a mobile device by using a Bluetooth signal according to the present embodiment is installed on the mobile device 30 or may be downloaded from the server 40 each time when necessary. In the present embodiment, identification numbers of beacons are stored in advance on the mobile device 30, and signal properties of the beacons corresponding to the identification numbers are received and stored by the mobile device 30 each time when necessary by accessing the server 40.

In this state, the mobile device 30 receives Bluetooth signals transmitted by the strong signal beacon 10 and the weak signal beacons 20, and determines signal properties of beacons corresponding to identification numbers included in the received Bluetooth signals (step (b); S200). As described above, each of the strong signal beacon 10 and the weak signal beacons 20 periodically transmits a Bluetooth signal including an identification number. If the mobile device 30 is located in a Bluetooth signal reception range, a Bluetooth signal of a beacon corresponding to the area is received. The mobile device 30 determines whether a beacon that transmitted the received Bluetooth signal is the strong signal beacon 10 or the weak signal beacons 20 based on an identification number included in the received Bluetooth signal. By checking records stored during an application installation process or stored by accessing the server 40, whether a beacon corresponding to each identification number is the strong signal beacon 10 or the weak signal beacons 20 is determined.

Next, whether a Bluetooth signal reception sensitivity of the mobile device 30 is normal is determined based on the identification numbers and the signal properties of the strong signal beacon 10 and the weak signal beacons 20 determined in step (b) (step (c); S300). If a Bluetooth signal of the weak signal beacons 20 is also received at points A and B of FIG. 1 where a Bluetooth signal of the strong signal beacon 10 is received, then a Bluetooth signal reception sensitivity of the mobile device 30 is determined as normal. That is, the Bluetooth signal reception sensitivity of the mobile device 30 itself is normal, and the surroundings of the mobile device 30 have no obstacle to receiving a Bluetooth signal. As at point C of FIG. 4, where a Bluetooth signal of the strong signal beacon 10 is received but a Bluetooth signal of the weak signal beacons 20 is not received, the mobile device 30 determines its Bluetooth signal reception sensitivity as abnormal. If a Bluetooth signal of the strong signal beacon 10 is received but a Bluetooth signal of the weak signal beacons 20 is not received, a Bluetooth signal receiving hardware of the mobile device 30 is set to low sensitivity or there is an obstacle that hinders reception of Bluetooth signals around the mobile device 30.

After the process of determining whether a Bluetooth signal reception sensitivity of the mobile device 30 is normal is completed as described above, a result of the determining is used to determine a location of the mobile device 30 relative to the strong signal beacon 10 and the weak signal beacons 20, the Bluetooth signals of which the mobile device 30 has received (step (d); S400).

Figure 4:
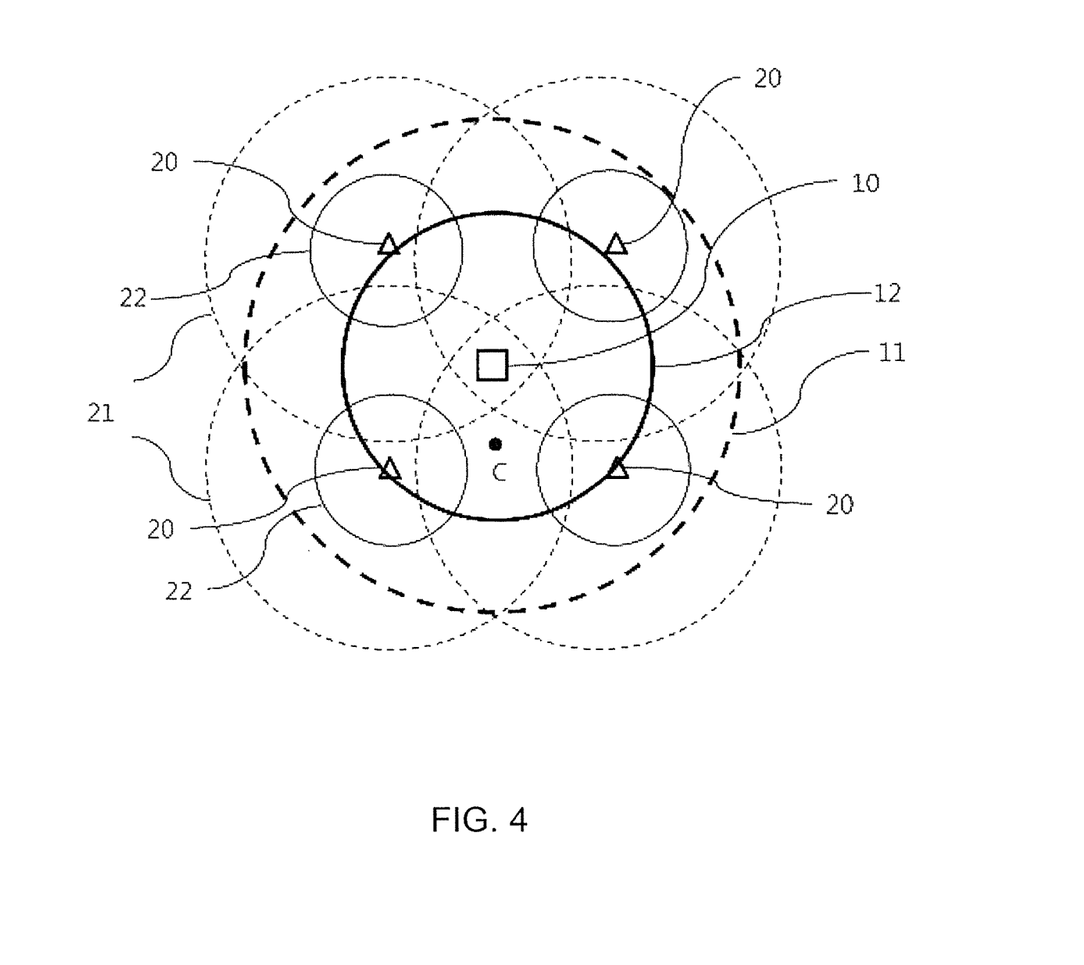
FIG. 4 is a schematic view for describing an operation of the system illustrated in FIGS. 1 and 2 for positioning a mobile device by using a Bluetooth signal and the method illustrated in FIG. 3 of positioning a mobile device by using a Bluetooth signal.

That is, when a Bluetooth signal reception sensitivity of the mobile device 30 is abnormal (when only a Bluetooth signal of the strong signal beacon 10 is received and a Bluetooth signal of the weak signal beacons 20 is not received), a location of the mobile device 30 is determined based on the Bluetooth signal of the strong signal beacon 10. FIG. 4 illustrates the Bluetooth signal reception ranges 12 and 22 of the strong signal beacon 10 and the weak signal beacons 20 when the Bluetooth signal sensitivity of the mobile device 30 is abnormal. An area denoted by a dotted line in FIG. 4 is Bluetooth signal ranges 11 and 21 of the beacons, and an area denoted by a solid line illustrates the Bluetooth signal reception ranges 12 and 22 of the mobile device 30. As the Bluetooth signal reception sensitivity of the mobile device 30 is abnormal, the Bluetooth signal reception ranges 12 and 22 where Bluetooth signals of the strong signal beacon 10 and the weak signal beacons 20 may be received by the mobile device 30 are smaller than the Bluetooth signal ranges 11 and 12. In this case, at point C of FIG. 4, a Bluetooth signal of the weak signal beacons 20 is not received but only a Bluetooth signal of the strong signal beacon 10 is received by the mobile device 30. In this case, if a Bluetooth signal of the strong signal beacon 10 is continuously received by the mobile device 30 for a predetermined period of time, the mobile device 30 may be determined to be within the Bluetooth signal range 12 of the strong signal beacon 10. Alternatively, a distance of the mobile device 30 relative to the strong signal beacon 10 may be quantitatively determined based on an intensity of the Bluetooth signal of the strong signal beacon 10 received by the mobile device 30. Here, by considering the abnormal Bluetooth signal reception sensitivity of the mobile device 30, the mobile device 30 may be determined to be closer to the strong signal beacon 10 than when a Bluetooth signal of an identical intensity is received with a normal Bluetooth signal reception sensitivity.

When a Bluetooth signal reception sensitivity of the mobile device 30 is normal (when a Bluetooth signal of the strong signal beacon 10 and a Bluetooth signal of at least one weak signal beacon 20 are received), a location of the mobile device 30 is determined based on the Bluetooth signal of the strong signal beacon 10 and the Bluetooth signal of the at least one weak signal beacon 20. In this case, as illustrated in FIG. 1, the Bluetooth signal ranges 11 and 21 and the Bluetooth signal reception ranges of the mobile device 30 may correspond to each other or become similar to each other.

If a Bluetooth signal of one weak signal beacon 20 is received like at point A of FIG. 1, the mobile device 30 determines its location to be in an area where the Bluetooth signal range 21 of the weak signal beacon 20 and the Bluetooth signal range 11 of the strong signal beacon 10 overlap each other. When Bluetooth signals of two or more weak signal beacons 20 are received like at point B of FIG. 1, the mobile device 30 determines its location to be in an area where the Bluetooth signal range 21 of the weak signal beacons 20 and the Bluetooth signal range 11 of the strong signal beacon 10 overlap each other. By using intensities of Bluetooth signals of the strong signal beacon 10 and the weak signal beacons 20 received by the mobile device 30, a location of the mobile device 30 among the weak signal beacons 20 may be quantitatively more accurately determined based on proximity of the mobile device 30 which is proportional to the intensities of the Bluetooth signals. In particular, when the server 40 stores information about relative locations including position coordinates of the strong signal beacon 10 and the weak signal beacons 20 or distances between the strong signal beacon 10 and the weak signal beacons 20, the location of the mobile device 30 may be determined more accurately. The mobile device 30 may receive the information about the relative locations including position coordinates of the strong signal beacon 10 and the weak signal beacons 20 or distances between the strong signal beacon 10 and the weak signal beacons 20 via the server 40 and may conduct calculation by applying the intensities of Bluetooth signals thereto so as to calculate a location of the mobile device 30 more accurately.

If only a Bluetooth signal of the weak signal beacons 20 is received or no Bluetooth signal is received at all, regardless of whether a Bluetooth signal reception sensitivity of the mobile device 30 is normal or not, this indicates that the mobile device 30 is located in an area that does not require positioning.

Determining a location of the mobile device 30 according to the present disclosure as described above, may be applied to diverse uses. For example, when a user is determined to be in proximity to a particular product in a mall, information about the product may be transmitted to the mobile device 30 of the user, or a service of sending a coupon for the product may be provided via a mobile network. When the present disclosure is applied to exhibition centers such as museums, and a user carrying the mobile device 30 approaches a particular object of an exhibition, the approach of the user may be automatically determined and information about the object may be provided to the mobile device 30 via a mobile network.

Mode for Invention

While the system and method for positioning a mobile device by using a Bluetooth signal according to the present disclosure has been described with reference to preferred embodiments above, the scope of the present disclosure is not limited to the embodiments described above and illustrated in the drawings.

For example, while signal properties of beacons are described above as being stored in the mobile device 30 in advance or received via the server 40 to be stored above, according to circumstances, signal properties of beacons may also be included in Bluetooth signals transmitted by the beacons. That is, the mobile device 30 may determine an identification number of a beacon and signal properties corresponding to the beacon by receiving a Bluetooth signal.

In addition, in step (a), a ratio of an intensity of a Bluetooth signal of the weal signal beacon 20 to an intensity of a Bluetooth signal of the strong signal beacon 10 may be stored in the mobile device 30 in advance or stored in the server 40, and then the ratio may be used when determining a location of the mobile device 30 in step (d). For example, if an intensity of a Bluetooth signal of the weak signal beacons 20 is set to 40% of an intensity of a Bluetooth signal of the strong signal beacon 10, in step (d), the above ratio is used in an intensity of a Bluetooth signal received by the mobile device 30 to thereby determine a distance or a location of the mobile device 30 relative to the strong signal beacon 10 and the weak signal beacons 20.

Figure 5:
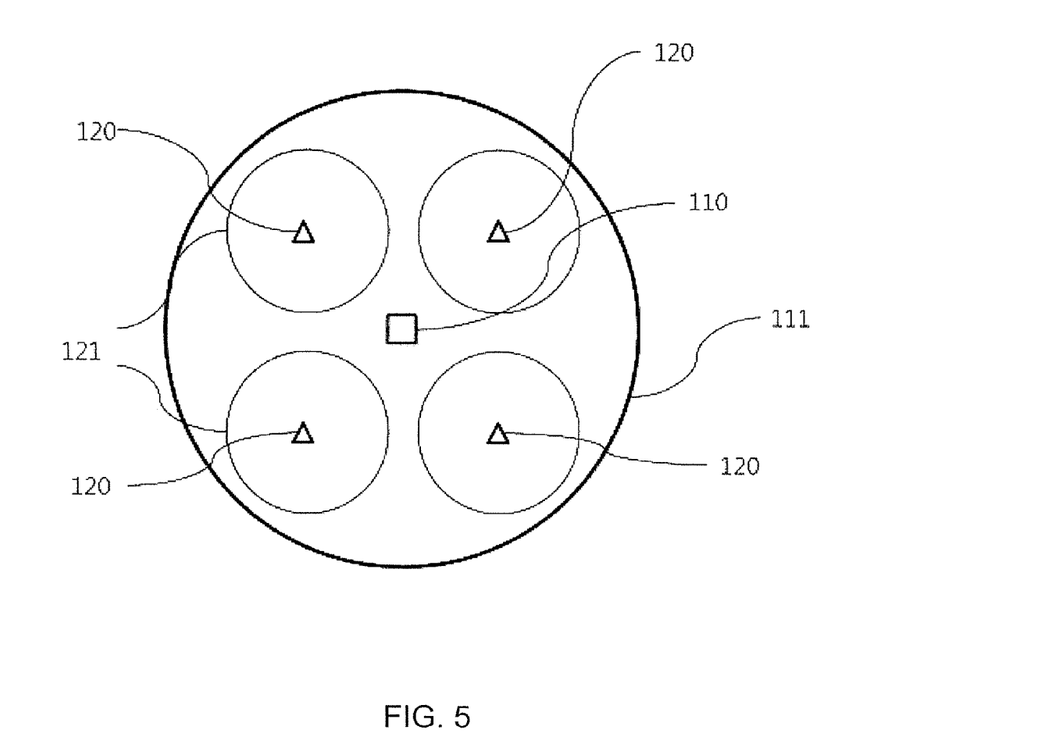
FIG. 5 is a schematic view for describing a structure of a system for positioning a mobile device by using a Bluetooth signal according to another embodiment of the present disclosure.

In addition, while the embodiment as illustrated FIG. 1 in which the Bluetooth signal range 11 of the strong signal beacon 10 is included in the sum of the Bluetooth signal ranges 21 of the weak signal beacons 20 is described above, an arrangement as illustrated in FIG. 5 may also be used. That is, as denoted by a solid line, the sum of Bluetooth signal ranges 121 of weak signal beacons 120 may be configured to be included in a Bluetooth signal range 111 of a strong signal beacon 110. In this case, proximity of the mobile device 30 to each of the weak signal beacons 120 may be more effectively determined. That is, a strong signal beacon and weak signal beacons may be combined in various manners, and the present disclosure may be modified into various configurations according to uses and purposes of determining a location of a mobile device.

What is claimed is:

1. A system for positioning a mobile device by using a Bluetooth signal, in which the mobile device receives the Bluetooth signal, which is periodically transmitted by a beacon, to determine the location of the mobile device, the system comprising:

a strong signal beacon configured to periodically transmit a first Bluetooth signal having a first identification number representing the strong signal beacon, with a relatively strong intensity;

a plurality of weak signal beacons arranged within a Bluetooth signal range of the strong signal beacon and each configured to transmit a second Bluetooth signal having a second identification number representing each of the plurality of weak signal beacons, with a relatively weak intensity compared to the intensity of the first Bluetooth signal; and a mobile device configured to store signal properties of the beacons including the strong signal beacon and the plurality of weak signal beacons corresponding to the identification numbers of the strong signal and the weak signal beacons and determine whether Bluetooth signal reception sensitivity of the mobile device is normal based on the identification numbers of the strong signal and the weak signal beacons included in the Bluetooth signal received by the mobile device and the signal properties corresponding to the identification numbers of the beacons and determine a location of the mobile device relative to the beacons based on a result of the determining whether the Bluetooth signal reception sensitivity of the mobile device is normal, wherein if only the first Bluetooth signal of the strong signal beacon is received, and the second Bluetooth signal of the plurality of weak signal beacons is not received, the mobile device determines the Bluetooth signal reception sensitivity as abnormal, and when the first Bluetooth signal of the strong signal beacon is continuously received for a predetermined period of time or longer, the mobile device determines its location to be within the Bluetooth signal range of the strong signal beacon.

2. The system of claim 1, wherein when the first Bluetooth signal of the strong signal beacon and the second Bluetooth signal of at least one of the plurality of weak signal beacons are received, the mobile device determines the Bluetooth signal reception sensitivity as normal, and determines the location to be within a Bluetooth signal range of the weak signal beacon that transmitted the received Bluetooth signal.

3. The system of claim 1, wherein when the first Bluetooth signal of the strong signal beacon and the second Bluetooth signal of at least one of the weak signal beacons are received, the mobile device determines the Bluetooth signal reception sensitivity as normal, and calculates location of the mobile device between the strong signal beacon and the at least one weak signal beacon by taking a ratio between intensities of the received Bluetooth signals into consideration.

4. The system of claim 1, further comprising a server on which the identification numbers of the beacons and the signal properties of the beacons corresponding to the identification numbers of the beacons are previously stored, wherein the mobile device accesses the server through a network to receive the signal properties of the beacons corresponding to the identification numbers of the beacons.

5. The system of claim 4, wherein information about relative locations including distances among the beacons is included in the server, wherein the mobile device inquires the server about information regarding the relative locations among the beacons and uses the information in determining the location of the mobile device.

6. The system of claim 1, wherein the signal properties of the beacons are stored in the beacons, and the beacons transmit the signal properties together with the identification numbers as the Bluetooth signal,
   wherein the mobile device receives and stores the signal properties of the beacons along with the identification numbers of the beacons from the beacons.

7. The system of claim 1, wherein a ratio of an intensity of the second Bluetooth signal of each of the plurality of weak signal beacons to an intensity of the first Bluetooth signal of the strong signal beacon is stored in the mobile device, and the mobile device determines its location by considering the ratio between the intensities of the first and second Bluetooth signals.

8. The system of claim 1, wherein the Bluetooth signal range of the strong signal beacon is included in a sum of Bluetooth signal ranges of the plurality of weak signal beacons.

9. A method of positioning a mobile device by using a Bluetooth signal, in which the mobile device receives the Bluetooth signal, which is periodically transmitted by a beacon, to determine a location of the mobile device, the method comprising:
   (a) storing first identification number of a strong signal beacon that periodically transmits a first Bluetooth signal including the first identification number of the strong signal beacon with a relatively strong intensity and a second identification number representing each of a plurality of weak signal beacons arranged within a Bluetooth signal range of the strong signal beacon, wherein each of the plurality of weak signal beacons is configured to transmit a second Bluetooth signal having the second identification number of the corresponding weak signal beacon with a relatively weak intensity compared to the intensity of the first Bluetooth signal of the strong signal beacon, and signal properties of the beacons including the strong signal beacon and the plurality of weak signal beacons correspond to the identification numbers of the beacons in the mobile device;
   (b) receiving first and second Bluetooth signals transmitted by the beacons, determining the first and second identification numbers of the strong and weak signal beacons included in the first and second Bluetooth signals, and determining the signal properties of the strong and weak signal beacons that transmitted the Bluetooth signals, wherein the receiving is performed by the mobile device;
   (c) determining whether a Bluetooth signal reception sensitivity of the mobile device is normal based on the identification numbers and the signal properties of the beacons included in the received first and second Bluetooth signals, wherein the determining is performed by the mobile device; and
   (d) determining the location of the mobile device relative to the beacons based on a result of (c),
   wherein in (c), when the mobile device receives only the first Bluetooth signal of the strong signal beacon but not the second Bluetooth signal of the plurality of weak signal beacons, the mobile device determines its Bluetooth signal reception sensitivity as abnormal, and
   wherein in (d), if the first Bluetooth signal of the strong signal beacon is continuously received for a predetermined period of time or longer, the mobile device determines the location of mobile device to be within the Bluetooth signal range of the strong signal beacon.

10. The method of claim 9, wherein in (c), when the mobile device receives the first Bluetooth signal of the strong signal beacon and the second Bluetooth signal of at least one of the plurality of weak signal beacons, the mobile device determines the Bluetooth signal reception sensitivity as normal, and
   wherein in (d), the mobile device determines location of the mobile device to be within a Bluetooth signal range of the weak signal beacon that transmitted the second Bluetooth signal received by the mobile device.

11. The method of claim 10, wherein in (d), the mobile device determines location of the mobile device among the weak signal beacons based on proximity of the mobile device which is proportional to an intensity of the second Bluetooth signal of the plurality of weak signal beacons received by the mobile device.

12. The method of claim 9, wherein in (a), wherein the mobile device accesses the server, on which the identification numbers of the beacons and the signal properties of the beacons corresponding to the identification numbers of the beacons are previously stored, through a network to receive and store the signal properties of the beacons corresponding to the identification numbers of the beacons.

13. The method of claim 12, wherein in (a), the mobile device receives and stores information about relative locations including distances among the beacons previously stored in the server,
   wherein in (d), the mobile device uses the information about the relative locations among the beacons received from the server in determining the location of the mobile device.

14. The method of claim 9, wherein the signal properties of the beacons are stored in the beacons, and the beacons transmit the signal properties of the beacons together with the identification numbers as the Bluetooth signal,
   wherein in (a), the mobile device receives and stores the signal properties of the beacons along with the identification numbers of the beacons from the beacons.

15. The method of claim 9, wherein in (a), the mobile device stores a ratio of an intensity of the second Bluetooth signal of the plurality of weak signal beacons to an intensity of the first Bluetooth signal of the strong signal beacon, and
   in (d), the mobile device determines the location of the mobile device by considering a ratio between the intensities of the first and second Bluetooth signals of the strong signal beacon and the plurality of weak signal beacons.

16. The method of claim 15, wherein, when the mobile device determines the Bluetooth signal reception sensitivity as normal in (c), the mobile device calculates the location of the mobile device between the strong signal beacon and the plurality of weak signal beacons by taking the intensities of the received Bluetooth signals into consideration in (d).

17. The method of claim 9, wherein the Bluetooth signal range of the strong signal beacon is included in a sum of Bluetooth signal ranges of the plurality of weak signal beacons.

* * * * *